(12) United States Patent
Menonna et al.

(10) Patent No.: US 9,416,687 B2
(45) Date of Patent: Aug. 16, 2016

(54) CAMSHAFT MODULE AND CORRESPONDING PRODUCTION METHOD

(71) Applicant: Mahle International GmbH, Stuttgart (DE)

(72) Inventors: Antonio Menonna, Ditzingen (DE); Thomas Flender, Eberdingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/395,260

(22) PCT Filed: Apr. 18, 2013

(86) PCT No.: PCT/EP2013/058081
§ 371 (c)(1),
(2) Date: Oct. 17, 2014

(87) PCT Pub. No.: WO2013/156564
PCT Pub. Date: Oct. 24, 2013

(65) Prior Publication Data
US 2015/0075457 A1 Mar. 19, 2015

(30) Foreign Application Priority Data
Apr. 19, 2012 (DE) .......................... 10 2012 206 499

(51) Int. Cl.
| F01L 1/14 | (2006.01) |
| F01L 1/047 | (2006.01) |
| B23P 11/00 | (2006.01) |
| B23P 19/04 | (2006.01) |

(52) U.S. Cl.
CPC ................ *F01L 1/047* (2013.01); *B23P 11/00* (2013.01); *B23P 19/042* (2013.01); *B23P 2700/02* (2013.01); *F01L 2103/00* (2013.01); *Y10T 29/49293* (2015.01)

(58) Field of Classification Search
CPC ...... F01L 1/047; F01L 2103/00; B23P 11/00; B23P 2700/02
USPC ............................. 123/90.6, 90.44; 29/888.1
See application file for complete search history.

(56) References Cited

U.S. PATENT DOCUMENTS

| 5,054,182 A | 10/1991 | Riemscheid et al. |
| 7,775,186 B2 | 8/2010 | Sakurai et al. |

(Continued)

FOREIGN PATENT DOCUMENTS

| DE | 3643803 A1 | 6/1988 |
| DE | 102008064194 A1 | 7/2010 |

(Continued)

*Primary Examiner* — Ching Chang
(74) *Attorney, Agent, or Firm* — Fishman Stewart PLLC

(57) ABSTRACT

A camshaft module may include a shaft and at least one functional element. The functional element may have a functional element opening through which the shaft passes. The functional element may be fixed to the shaft in a seat portion of the shaft. The camshaft module may include a bearing arrangement in which at least one bearing portion of the shaft is mounted. The shaft may include at least one adjusting portion axially adjacent to the at least one seat portion. The adjusting portion may have a first outer diameter smaller than a second outer diameter of the seat portion. The functional element opening may have an inner diameter smaller than the second outer diameter of the seat portion and larger than the first outer diameter of the adjusting portion such that a press fit fixing is realized between the functional element and the seat portion of the shaft.

20 Claims, 3 Drawing Sheets

(56) References Cited

U.S. PATENT DOCUMENTS

2013/0125699 A1  5/2013  Bechtold
2013/0283613 A1* 10/2013  Walter et al.

FOREIGN PATENT DOCUMENTS

| | | |
|---|---|---|
| DE | 102009051636 A1 | 5/2011 |
| DE | 102009060348 A1 | 6/2011 |
| DE | 102009060350 A1 | 6/2011 |
| DE | 102010032746 A1 | 2/2012 |
| DE | 102010045047 A1 | 3/2012 |
| DE | 102010055123 A1 | 6/2012 |
| EP | 1155770 A2 | 11/2001 |
| EP | 1936131 A1 | 6/2008 |
| WO | WO-2009/065970 A1 | 5/2009 |

* cited by examiner

CAMSHAFT MODULE AND CORRESPONDING PRODUCTION METHOD

CROSS-REFERENCE TO RELATED APPLICATIONS

This application claims priority to International Patent Application PCT/EP2013/058081 filed Apr. 18, 2013 and German Patent Application No. 10 2012 206 499.0 filed Apr. 19, 2012, the contents of which are hereby incorporated by reference in their entirety.

TECHNICAL FIELD

The present invention relates to a method for producing a camshaft module with a shaft and with at least one functional element according to the introductory clause of claim 1, and such a camshaft module.

BACKGROUND

A camshaft serves in a known manner for example for the actuation of inlet and outlet valves of an internal combustion engine, and is sufficiently known from the prior art. It is desirable here to mount the camshaft in a bearing arrangement and to arrange it thereover in a camshaft module, in order to achieve a simplified mounting of the camshaft on the associated internal combustion engine. The bearing arrangement can be configured for example as a cylinder head cover, so that on assembly or respectively on installing of the associated internal combustion engine only the camshaft module has to be mounted onto the internal combustion engine.

Such a camshaft module is known for example from DE 10 2009 060 350 A1. Here, functional elements, in particular cams, of the camshaft module are first arranged in positioning disks and are brought in a desired axial position and angular alignment and are secured in this position or respectively alignment. Subsequently, a shaft is pushed through a functional element opening of the respective functional element by a relative movement of the functional elements and the shaft. After the pushing through of the shaft through the functional elements, the functional elements are fixed on the shaft.

Further such camshaft modules or respectively corresponding production methods are known from DE 10 2008 064 194 A1 and from DE 10 2009 051 636 A1 and from DE 10 2009 060 348 A1.

A disadvantage in these camshaft modules is that an axial positioning of the respective functional element on the shaft and a precise angular alignment of the respective functional element before the introduction of the shaft are difficult to realize. If, in addition, in the case of the bearing arrangement a cylinder head cover is concerned, this precise positioning or respectively alignment is made difficult in that little space is available within the cylinder head cover. Also, certain sites of the bearing arrangement can be difficult to access for the positioning or respectively alignment of the functional element.

SUMMARY

The present invention is concerned with the problem of indicating an improved embodiment for a camshaft module and for a corresponding production method, which is distinguished in particular by a simplified mounting and/or by a precise positioning and/or by a precise alignment of associated functional elements and/or by a favourably priced production.

This problem is solved according to the invention by the subjects of the independent claims. Advantageous embodiments are the subject of the dependent claims.

The present invention is based on the general idea of realizing the positioning and/or alignment of functional elements of a camshaft module after the introduction of an associated shaft into the camshaft module, wherein the angular alignment of the respective functional element is realized by a rotation of the shaft. In accordance with the idea of the invention, the camshaft module comprises the shaft and at least one such functional element, which has a functional element opening, through which the shaft passes. In the finished mounted camshaft module, the functional element is fixed in a seat portion of the shaft with the latter, wherein the fixing takes place expediently by means of a press fit. In addition, the camshaft, having the at least one functional element and the shaft, is mounted in a bearing arrangement. Expediently, the shaft has at least one adjusting portion, which is axially adjacent to the seat portion, wherein the axial direction with respect to the shaft is provided. Here, a first outer diameter of the adjusting portion or respectively in the region of the adjusting portion is smaller than a second outer diameter of the seat portion or respectively in the region of the seat portion. Furthermore, an inner diameter of the functional element opening is smaller than the second outer diameter of the seat portion and larger than the first outer diameter of the adjusting portion. Such a configuration of the shaft and of the functional element serve the purpose here of first arranging the functional element during the production or respectively mounting of the camshaft module in the adjusting portion, where the shaft and the functional element are movable relative to one another. Subsequently, the functional element is moved into the seat portion, wherein a desired angular alignment of the functional element is achieved by a rotation of the shaft. Accordingly, a method according to the invention for the production of such a camshaft module can take place in that first the at least one functional element is introduced into the bearing arrangement such that the functional element opening is aligned with bearing sites of the bearing arrangement in which the shaft is subsequently mounted. Subsequently, the shaft is inserted through the bearing sites and through the functional element opening into the bearing arrangement, wherein the functional element is heated up, before the insertion of the shaft, to such an extent that the shaft can be pushed through the functional element opening. In addition, in the arrangement or respectively on introducing of the functional element into the bearing arrangement, it is to be taken into consideration that the functional element during the subsequent insertion of the shaft into the bearing arrangement is arranged in such an associated adjusting portion of the shaft. Therefore, the functional element and the shaft are movable relative to one another after the introduction of the shaft into the bearing arrangement. In particular, the shaft can be rotated without the functional element being rotated. According to the invention, the shaft is rotated next into a position which corresponds to a desired angular alignment of the functional element in such an associated seat portion. In other words, the angular alignment of the functional element is achieved in that the shaft is rotated relative to the functional element. When the shaft is rotated into such a position, the functional element is heated to such an extent that the inner diameter of the functional element opening is larger than the second outer diameter of the associated seat portion and the functional element can therefore be moved into the associated seat portion. The moving of the functional element into the associated seat portion takes place here in axial direction. Subsequently, the functional element is fixed in the associated seat portion with the shaft, wherein the fixing takes place preferably in that the functional element cools down and accordingly is fixed with the shaft by the press fit, in particular a transverse press fit.

Therefore, in particular a rotation of the functional element for realizing the angular alignment of the functional element can be dispensed with. By the choice of the arrangement of the functional element in the adjusting portion or respectively by the choice of the associated adjusting portion, in addition an access to the functional element and a corresponding axial movement of the functional element are facilitated. Consequently, the camshaft module according to the invention is able to be mounted easily and is therefore able to be produced at a favourable cost. In addition, a precise positioning of the functional element and/or a precise angular alignment of the functional element on the shaft is simplified.

The functional element can be constructed here as a cam, as a bearing ring, as a signal transmitter wheel, as a sleeve, as a rotary encoder, as a toothed wheel, as an alignment element or as a mounting aid element.

Furthermore, the bearing arrangement can be a component of a cylinder head cover or of a bearing frame.

In order to ensure and/or to improve the relative movement of the functional element to the shaft in an arrangement of the functional element in the adjusting portion, an axial extent of the adjusting portion is equal to or greater than an axial extent of the functional element. Therefore, the functional element and the shaft, in an arrangement of the functional element in the adjusting portion, are rotatably movable and/or axially movable relative to one another.

The bearing of the camshaft in the bearing arrangement can be realized for example by means of one or more sliding bearings and/or one or more rolling bearings. Alternatively or additionally, the camshaft can have a slide coating, in particular in corresponding bearing sites. Such a slide coating is achieved here for example by a phosphatization of the camshaft, in particular of the shaft. For the bearing of the camshaft, the bearing arrangement can have at least one bearing channel with at least two bearing sites, in which for example the said sliding bearings and/or rolling bearings are realized or respectively arranged.

Expediently, the camshaft, in particular the shaft, has one or more bearing portions which, for bearing the camshaft in the bearing arrangement, are mounted in the bearing arrangement, in particular in the said bearing sites. The bearing section can be arranged here adjacent axially to such an adjusting portion and/or to such a seat portion.

In preferred embodiments the shaft has in the region of the bearing portion a third outer diameter which corresponds to the second diameter in the region of the seat portion. Preferably, the third outer diameter corresponds to the second diameter. Therefore in particular the production of the shaft is simplified, because the shaft has substantially two different outer diameters. Accordingly, such a shaft is able to be produced considerably more economically and simply compared with a shaft in which the first outer diameter, the second outer diameter and the third outer diameter are respectively different.

It shall be understood that the camshaft module can have several functional elements. The camshaft module can also have two or more camshafts, which run in particular in parallel. Preferably, the respective camshaft is mounted here in an associated bearing channel or respectively in an associated bearing arrangement.

The fixing of the functional element with the shaft, as already mentioned is preferably realized by a transverse press fit. As the functional element is already heated up before the insertion of the shaft into the bearing arrangement or respectively through the functional element opening, the functional element can also be kept heated continuously up to cooling down in the associated seat portion.

It is also conceivable to realize the press fit by a longitudinal press fit. Here, the functional element is pushed onto the seat portion, without it being heated up to such an extent that it can be pushed onto the associated seat portion with play. In this case, the fixing of the functional element with the shaft takes place during the movement of the functional element into the associated seat portion.

The production or respectively mounting of the camshaft module can be carried out with the aid of a mounting device. The mounting device preferably has here a positioning device which moves the functional element axially into the associated seat portion.

It shall be understood that the shaft can have such an adjacent adjusting portion on both axial sides of the respective seat portion. Accordingly, during the production or respectively mounting of the camshaft module, a decision can be made as to from which axial side of the seat portion a facilitated access to the associated functional element is provided. Consequently, the functional element is introduced into the bearing arrangement such that, after the subsequent pushing through of the shaft, it is arranged in this adjusting portion ensuring easier access.

When the respective camshaft has several functional elements, these can also be fixed with the shaft by the method according to the invention, wherein here all the functional elements are brought into the bearing arrangement before the pushing through of the shaft, and are arranged in the bearing arrangement such that their functional element openings are aligned with the bearing sites of the bearing arrangement and that they are arranged respectively in such an associated adjusting portion. After the fixing of the first functional element, the second functional element can then be fixed with the shaft, by firstly the shaft being rotated into a position which corresponds to a desired angular alignment of this functional element in such an associated seat portion, by the functional element, in particular with the aid of the positioning device, being moved axially into the associated seat portion and being fixed with the shaft in the associated seat portion. Of course, the rotation of the shaft for achieving the desired angular alignment of the respectively functional element can be dispensed with when the shaft is already situated in such a position. In particular, the rotation of the shaft can be dispensed with in the angular alignment of the first functional element. Alternatively or additionally, the respective functional element can be glued for fixing with the shaft.

It shall be understood that the respective functional element is held during the rotation of the shaft for achieving the desired angular alignment, in order to achieve as precise an angular alignment as possible. It is mentioned in addition that the shaft, on moving of the functional element into the seat portion and/or on fixing of the functional element with the shaft can be held in order to permit a precise positioning of the functional element in particular in the case of the longitudinal press fit.

In a further advantageous embodiment, the at least one adjusting portion can be processed with a comparatively favourable turning method, whilst the at least one seat portion and/or the at least one bearing portion is ground. It is therefore possible to further reduce the production costs of the camshaft module.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
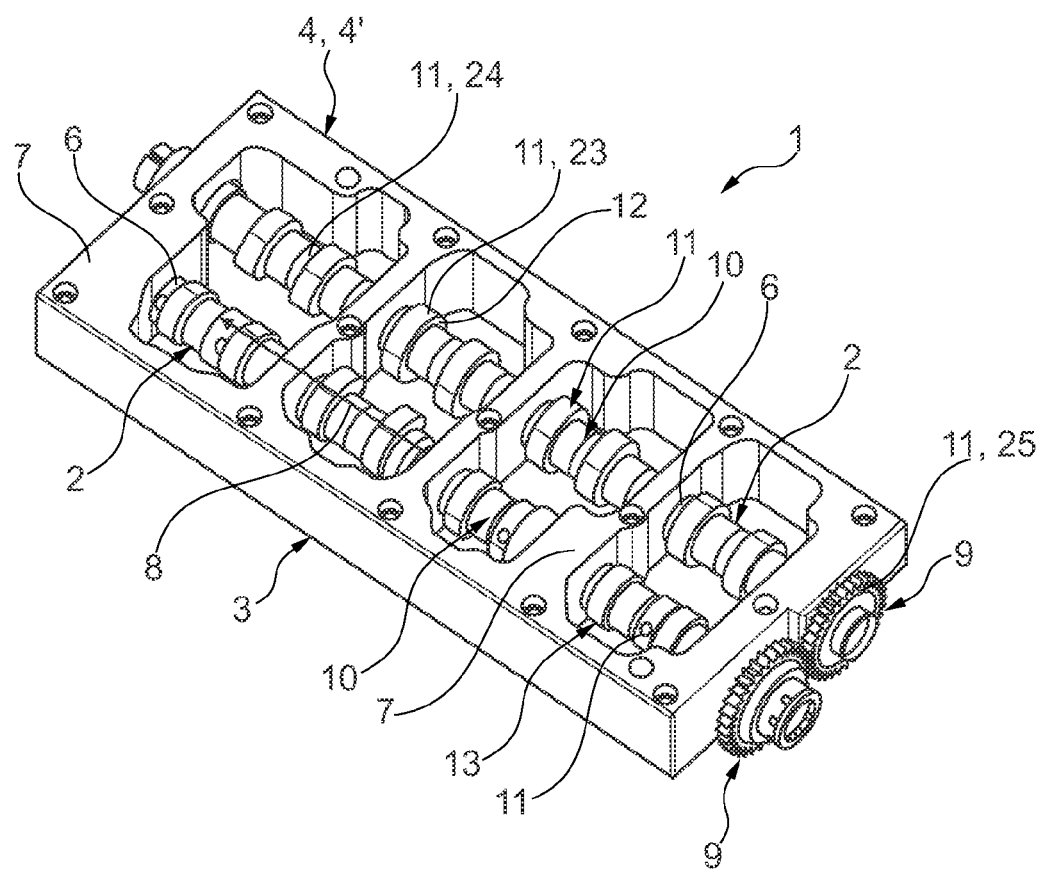
FIG. 1 a three-dimensional view of a camshaft module.
Figure 2:
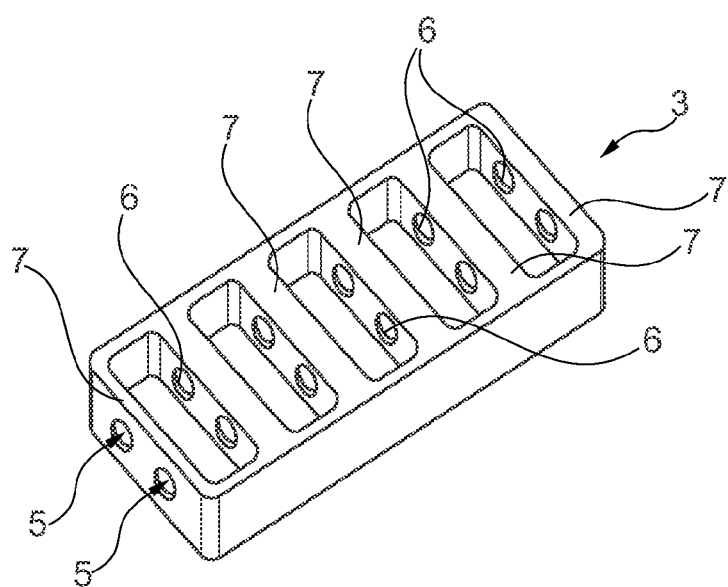
FIG. 2 a three-dimensional view of a bearing arrangement.

According to FIG. 1, a camshaft module 1 has at least one camshaft 2, which is mounted in a bearing arrangement 3 of the camshaft module 1 (cf. FIG. 3), wherein the camshaft module 1 shown in FIG. 1 has two such camshafts 2, which run in parallel. Here, the bearing arrangement 3 can be a component of a cylinder head cover 4 or of a bearing frame 4'. For bearing the respective camshaft 2, the bearing arrangement 3, as shown in FIG. 2, has a bearing channel 5, wherein the respective bearing channel 5 in the example shown in FIG. 2 has six bearing sites 6 and in the example shown in FIG. 1 has 5 such bearing sites 6. The respective bearing sites 6 are constructed in dividing walls 7, which run transversely to the axial direction 8 of the respective camshaft 2. As can be seen in FIG. 1, the camshafts 2 have at their axial ends respectively a drive device 9 which, to drive the camshafts 2, can be coupled with an associated internal combustion engine, in particular with a crankshaft of the internal combustion engine and optionally with one another, and are constructed as toothed wheels.

The respective camshaft 2 comprises a shaft 10 and several functional elements 11 fixed to the shaft 10. The respective functional element 11 has a functional element opening 12, through which the shaft 10 passes. The respective functional element 11 is fixed with the shaft 10 here by means of a press fit in a seat portion 13 of the shaft 10.

Figure 3:
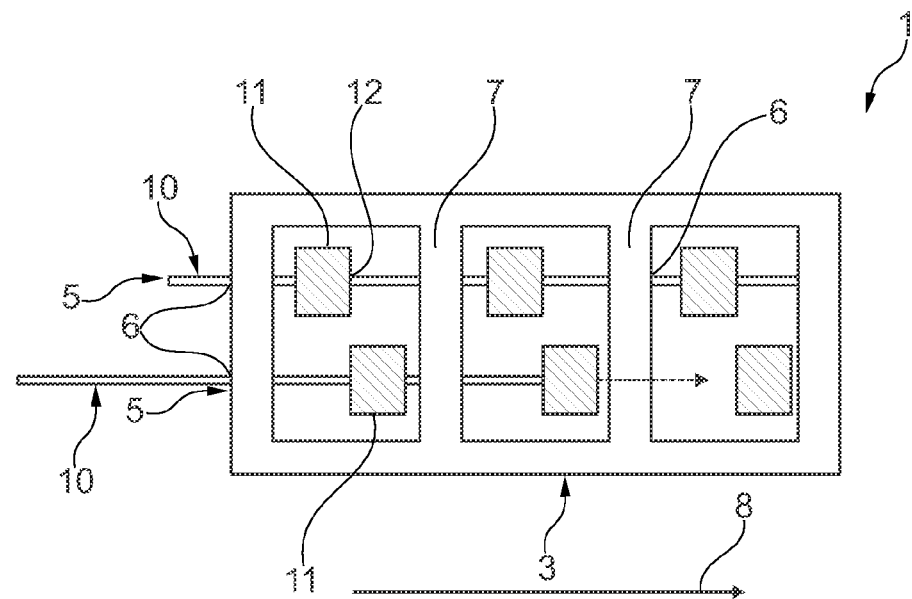
FIG. 3 a section through a camshaft module during production.
Figure 4:
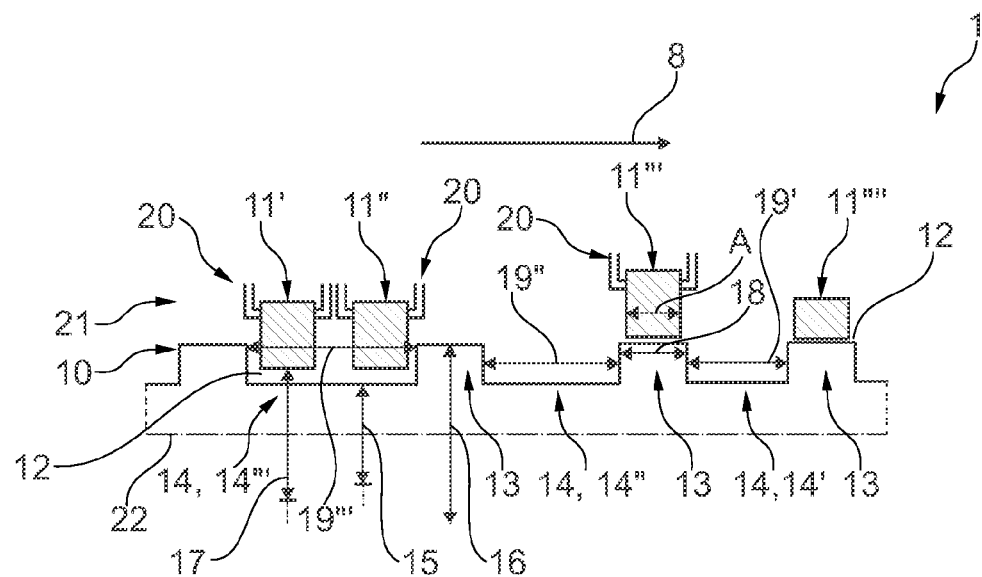
FIG. 4 a section through a camshaft during the production of the camshaft module, FIG. 5 a section through a camshaft module according to the invention.

As is shown in FIG. 4, the shaft 10 has at least one adjusting portion 14 axially adjacent to the respective seat portion 13. Here, a first outer diameter 15 of the shaft 10 in the region of the adjusting portion 14 is smaller than a second outer diameter 16 in the region of the seat portion 13. In addition, an inner diameter 17 of the functional element opening 11 is smaller than the second outer diameter 16 of the seat portion 13 and larger than the first outer diameter 15 of the adjusting portion 14. Here, the mounting or respectively production of the camshaft module 1 can proceed as follows:

The respective functional elements 11 are firstly introduced into the bearing arrangement 3, as is illustrated for example in FIG. 2. Here, the functional elements 11 are arranged in the bearing arrangement 3 so that the functional element opening 12 of the respective functional element 11 is aligned with the bearing sites 6 of the associated bearing channel 5. Subsequently, as illustrated in FIG. 3, the shaft 10 is pushed through the bearing sites 6 of the associated bearing channel 5 and through the functional element openings 12 of the associated functional elements 11 into the bearing arrangement 3. Here, in FIG. 3 the upper shaft 10 in the illustrated view is already pushed entirely into the bearing arrangement 3, whilst the lower shaft 10 is pushed from left to right into the associated bearing channel 5 or respectively through the associated functional elements 11. On penetrating of the functional elements 11 into the bearing arrangement 3, it is to be taken into consideration here that after the inserting of the associated shaft 10 into the bearing arrangement 3, the respective functional element 11 is arranged in such an associated adjusting portion 14.

Such an arrangement of the functional elements 11 can be seen in FIG. 4 in the two left-hand functional elements 11', 11" in the view which is shown. Here, it can also be seen that an axial extent A of the respective functional element 11 corresponds substantially to the axial extent 18 of the seat portion 13, whereas an axial extent 19 of the respective adjusting portion 14 is larger than the axial extent A of the respective functional element 11. In addition, all the functional elements 11 have the same axial extent A. Also, all the illustrated seat portions 13 have the same axial extent 18, whereas the adjusting portions 14 have different axial extents 19. Thus, the axial extent 19' of the adjusting portion 14' is smaller than the axial extent 19" of the adjusting portion 14", which in turn is smaller than the axial extent 19''' of the adjusting portion 14'''.

As the inner diameter 17 of the functional element opening 12 is smaller than the second outer diameter 16 of the seat portions 13, the respective functional element 11 is heated up before the insertion of the shaft 10 into the bearing arrangement 3, shown in FIG. 3, to such an extent that the shaft 10 and in particular the seat portions 13 and bearing portions 26 (see FIG. 5) fit through the respective functional element opening 12. Here, the two left-hand functional elements 11', 11" in FIG. 4 are shown in a state in which they are already cooled down again, so that the shaft 10 and these functional elements 11', 11" are only movable relative to one another in the associated adjusting portion 14'''. In addition, the shaft 10 and the functional elements 11', 11" can be rotated relative to one another.

For mounting the respective functional element 11, as illustrated in the case of functional element 11''', the respective functional element 11 is heated up to such an extent that it can be moved with the aid of gripper arms 20 of a positioning device 21 with play onto the associated seat portion 13. Subsequently, the press fit between the functional elements 11 and the shaft 10 in the associated seat portion 13 is realized by cooling of the functional element 11, this state being illustrated in the right-hand functional element 11''''. Before the moving of the respective functional element 11 into the associated seat portion 13, the shaft 10 is rotated about its rotation axis 22, until a position of the shaft 10 relative to this functional element 11 corresponds to a desired angular alignment of this functional element 11. After the fixing of this functional element 11 with the shaft 10, the shaft is rotated, if required, again about its rotation axis 22 until a desired angular alignment is reached for the next functional element 11 which is to be fixed. Only then is the latter functional element 11 moved into the associated seat portion 13. Therefore, on the one hand a precise axial positioning of the respective functional element 11 on the shaft 10 is possible, and on the other hand a precise angular alignment of the respective functional element on the shaft 10 is ensured.

In addition, the camshaft module 1 according to the invention and the corresponding production method present the advantage that the respective functional element 11 for fixing with the shaft 10 if required is optionally accessible from one of the axially adjacent sides of the associated seat portion 13 or of the other adjacent sides. If the access to one of the functional elements 11, here to the functional element 11", is made difficult by one of the adjusting portions 14 adjacent to the associated seat portion 13, here to the adjusting portion 14", for example by such a dividing wall 7, the functional element 11" on introduction into the bearing arrangement 3 can be arranged such that after the insertion of the shaft 10 it is arranged in the other adjusting portion 14'.

The respective functional element 11 here can be any component of the camshaft 2 which is to be fixed on the shaft 10. Thus, the respective functional element 11 can be constructed for example as a cam 23, as a bearing ring 24 or as a toothed wheel 25 and suchlike.

Alternatively or additionally to the press fit, the respective functional element 11 can be glued with the shaft 10 in the associated seat portion 13.

Figure 5:
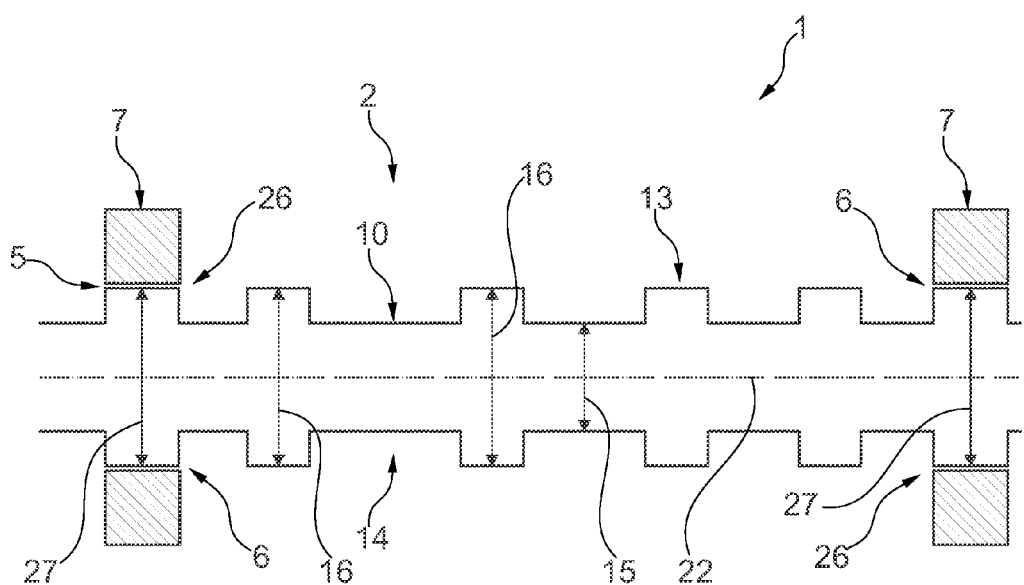

As illustrated in the section shown in FIG. 5, the bearing portions 26 of the shaft 10 are mounted respectively in such a bearing site 6 of the bearing channel 5, wherein in FIG. 5, due to the illustration, no functional elements 10 are shown. It can be seen here that the shaft 10 has a third outer diameter 27 in the region of the bearing portions 26. The third outer diameter 27 of the bearing portions 26 corresponds to the second outer diameter 16 of the seat portions 13. Therefore, the shaft 10 has only two different outer diameters 15, 16, 27, so that the production of the shaft 10 can be realized considerably more simply and economically than in the case of a shaft 10 with three different outer diameters 15, 16, 27.

The invention claimed is:

1. A method for producing a camshaft module, comprising:
   providing a shaft and at least one receiving element, the at least one receiving element having a receiving element opening through which the shaft passes,
   fixing the at least one receiving element to the shaft on at least one seat portion of the shaft, and mounting the shaft into a bearing arrangement via at least one bearing portion of the shaft, wherein:
   the shaft has at least one adjusting portion axially adjacent to the at least one seat portion,
   a first outer diameter of the shaft in a region of the at least one adjusting portion is smaller than a second outer diameter of the shaft in a region of the at least one seat portion,
   an inner diameter of the receiving element opening of the at least one receiving element is smaller than the second outer diameter of the shaft and larger than the first outer diameter of the shaft,
   wherein before fixing the at least one receiving element to the shaft, further comprising:
     placing the at least one receiving element into the bearing arrangement, aligning the receiving element opening with at least two bearing sites of the bearing arrangement, and arranging the at least one receiving element on the subsequent insertion of the shaft into the bearing arrangement in the at least one adjusting portion of the shaft,
     heating the at least one receiving element to such an extent that the shaft is insertable through the receiving element opening,
     pushing the shaft through the receiving element opening and through the at least two bearing sites into the bearing arrangement,
     rotating the shaft into a position corresponding to a desired angular alignment of the at least one receiving element relative to the at least one seat portion,
     heating the at least one receiving element to such an extent that the at least one receiving element is moveable with play relative to the at least one seat portion,
     moving the at least one receiving element axially into the at least one seat portion, and
   wherein fixing the at least one receiving element to the shaft includes cooling the at least one receiving element relative to the shaft for securing the at least one receiving element on the at least one seat portion of the shaft.

2. The method according to claim 1, wherein providing the shaft includes processing the shaft to such an extent that the shaft does not require any further processing after mounting the shaft into the bearing arrangement.

3. The method according to claim 1, further comprising at least one of processing the at least one adjusting portion via a turning method, and grinding the at least one seat portion.

4. The method according to claim 1, wherein fixing the at least one receiving element to the shaft further includes gluing the at least one receiving element to the shaft.

5. A camshaft module, comprising:
   a shaft and at least one receiving element, the at least one receiving element having a receiving element opening through which the shaft passes, the at least one receiving element fixed to the shaft in at least one seat portion of the shaft;
   a bearing arrangement in which at least one bearing portion of the shaft is mounted;
   wherein the shaft includes at least one adjusting portion axially adjacent to the at least one seat portion, the at least one adjusting portion having a first outer diameter smaller than a second outer diameter of the at least one seat portion;
   wherein the receiving element opening of the at least one receiving element has an inner diameter smaller than the second outer diameter of the at least one seat portion and larger than the first outer diameter of the at least one adjusting portion such that a press fit connection is defined between the at least one receiving element and the shaft on the at least one seat portion.

6. The camshaft module according to claim 5, wherein the at least one bearing portion of the shaft includes a third outer diameter corresponding substantially to the second outer diameter of the at least one seat portion.

7. The camshaft module according to claim 6, wherein the at least one adjusting portion includes an axial extent that is at least equal to an axial extent of the at least one receiving element.

8. The camshaft module according to claim 6, wherein the bearing arrangement has at least one bearing channel with at least two bearing sites bearing the shaft.

9. The camshaft module according to claim 5, wherein the at least one adjusting portion includes an axial extent that is larger than or equal to an axial extent of the at least one receiving element.

10. The camshaft module according to claim 9, wherein the at least one receiving element includes an axial extent that corresponds substantially to an axial extent of the at least one seat portion.

11. The camshaft module according claim 5, wherein the bearing arrangement has at least one bearing channel with at least two bearing sites bearing the shaft.

12. The camshaft module according to claim 11, wherein the bearing arrangement is a component of a cylinder head cover or a bearing frame.

13. The camshaft module according to claim 5, wherein the bearing arrangement is a component of a cylinder head cover or a bearing frame.

14. The camshaft module according to claim 13, wherein the shaft is mounted via at least one of a sliding bearing and a rolling bearing in the bearing arrangement.

15. The camshaft module according to claim 5, further comprising another shaft mounted in the bearing arrangement.

16. The camshaft module according to claim 5, wherein the at least one receiving element is configured as a cam, a bearing ring, a signal transmitter wheel, a sleeve, a rotary encoder, a toothed wheel, an alignment element or a mounting aid element.

17. The camshaft module according to claim 5, wherein at least one of:
the shaft is mounted via at least one of a sliding bearing and a rolling bearing in the bearing arrangement, and
the shaft has a slide coating.

18. The camshaft module according to claim 5, further comprising another shaft, wherein the bearing arrangement has two bearing channels each with at least two bearing sites for bearing a respective shaft.

19. The camshaft module according to claim 5, wherein the at least one receiving element includes an axial extent that corresponds substantially to an axial extent of the at least one seat portion.

20. A camshaft module, comprising:
a shaft including at least two adjusting portions each having a first outer diameter, at least one seat portion disposed between the at least two adjusting portions having a second outer diameter, and at least two bearing portions each having a third outer diameter, wherein the first outer diameter is smaller than the second outer diameter, and the first outer diameter is substantially equal to the third outer diameter;
a bearing arrangement having at least one bearing channel, the bearing channel including at least two bearing sites for mounting the at least two bearing portions of the shaft;
at least one receiving element including a receiving element opening through which the shaft passes;
wherein the receiving element opening of the at least one receiving element includes an inner diameter larger than the first outer diameter of the at least two adjusting portions such that the at least one receiving element is axially movable relative to the at least two adjusting portions of the shaft, and the inner diameter of the receiving element opening of the at least one receiving element is smaller than the second outer diameter of the at least one seat portion to fix the at least one receiving element on the at least one seat portion of the shaft via a press fit; and
wherein the at least two adjusting portions include a differing axial extent from each other, and the differing axial extent of the at least two adjusting portions is larger than another axial extent of the at least one receiving element.

* * * * *